(12) United States Patent
Chiu

(10) Patent No.: US 9,227,742 B2
(45) Date of Patent: Jan. 5, 2016

(54) SEALING MACHINE AND THE PROTECTING STRUCTURE FOR THE SAME

(71) Applicant: CHAN LI MACHINERY CO., LTD., Taoyuan (TW)

(72) Inventor: Chui-An Chiu, Taoyuan (TW)

(73) Assignee: Chan Li Machinery Co., Ltd., Taoyuan (TW)

( * ) Notice: Subject to any disclaimer, the term of this patent is extended or adjusted under 35 U.S.C. 154(b) by 158 days.

(21) Appl. No.: 13/975,550

(22) Filed: Aug. 26, 2013

(65) Prior Publication Data

US 2014/0215966 A1 Aug. 7, 2014

(30) Foreign Application Priority Data

Feb. 6, 2013 (TW) .............................. 102104650 A

(51) Int. Cl.
| | |
|---|---|
| *H05B 3/02* | (2006.01) |
| *D06F 75/08* | (2006.01) |
| *D06F 75/24* | (2006.01) |
| *B65B 7/06* | (2006.01) |
| *B29C 65/00* | (2006.01) |
| *B65B 51/14* | (2006.01) |
| *B29C 65/22* | (2006.01) |

(52) U.S. Cl.
CPC ................. *B65B 7/06* (2013.01); *B29C 65/224* (2013.01); *B29C 66/1122* (2013.01); *B29C 66/21* (2013.01); *B29C 66/346* (2013.01); *B29C 66/3472* (2013.01); *B29C 66/43121* (2013.01); *B29C 66/81419* (2013.01); *B29C 66/81433* (2013.01); *B29C 66/83221* (2013.01); *B29C 66/849* (2013.01); *B65B 51/146* (2013.01); *B29C 65/223* (2013.01); *B29C 66/0044* (2013.01)

(58) Field of Classification Search
CPC ...... B29C 65/02; B29C 65/18; B29C 65/224; B29C 66/0044; B29C 66/21; B29C 66/346; B29C 66/3472; B29C 66/43121; B29C 66/81419; B29C 66/81433; B29C 66/83221; B29C 66/849; B65B 7/06; B65B 51/146
USPC ......... 219/222, 225, 228, 243, 245, 254, 255, 219/259
See application file for complete search history.

(56) References Cited

U.S. PATENT DOCUMENTS

| | | | | |
|---|---|---|---|---|
| 4,172,750 | A * | 10/1979 | Giulie | 156/267 |
| 4,923,556 | A * | 5/1990 | Kettelhoit et al. | 156/498 |
| 5,616,199 | A * | 4/1997 | Jurrius et al. | 156/64 |
| 6,197,136 | B1 * | 3/2001 | Hishinuma | 156/64 |
| 6,666,004 | B2 * | 12/2003 | Hilbert et al. | 53/450 |
| 6,789,371 | B1 * | 9/2004 | Buysman et al. | 53/373.7 |
| 2010/0116809 | A1 * | 5/2010 | Cheney et al. | 219/240 |

* cited by examiner

*Primary Examiner* — Dana Ross
*Assistant Examiner* — Lindsey C Teaters
(74) *Attorney, Agent, or Firm* — Rosenberg, Klein & Lee

(57) ABSTRACT

A sealing machine and the protecting structure that fit a wide range of sealing conditions and plastic bag materials, and prevent the plastic bag from breaking around the sealing line due to excessive fusion and tension are disclosed. The sealing machine comprises a pair of block members, each block member is disposed with an electrical heating wire, each electrical heating wire is covered with a first protecting belt, and each first protecting belt is covered with a second protecting belt. Each first protecting belt or second protecting belt comprises a plurality of apertures.

10 Claims, 10 Drawing Sheets

US 9,227,742 B2

SEALING MACHINE AND THE PROTECTING STRUCTURE FOR THE SAME

FIELD OF THE INVENTION

The present invention relates to bag sealing technology and more particularly, to a sealing machine and the protecting structure, that fit a wide range of sealing conditions and plastic bag materials, and prevent the plastic bag from breaking around the sealing line.

BACKGROUND OF THE INVENTION

Referring to FIGS. 1A-2C, there are shown schematic diagrams of operational steps, enlarged view and side views of operational steps of a conventional sealing machine. As illustrated, the sealing machine 20 of the prior art comprises two block members 22, two electrical heating wires 24 respectively mounted at the block members 22 opposite to each other, and two protecting belts 26 respectively covered on the electrical heating wires 24 to protect the electrical heating wires 24 against contamination of fused material of the plastic bag 10 during a sealing operation.

During operation of the aforesaid sealing machine 20, a plastic bag 10 that is filled with goods 15 are pressed together from the top and bottom sides or the opposite lateral sides around the opening by the block members 22, and the plastic bag 10 is folded along the folding lines 12. When the block members 22 are pressed on the plastic bag 10 against each other, the temperature of the electrical heating wires 24 causes the plastic material of the plastic bag 10 to be fused together and form a sealing line 14, as shown in FIGS. 1A-1C and FIGS. 2A-2C.

After the plastic bag 10 is folded, there are two four-layer film parts 16 and one double-layer film part 18 in the plastic bag 10 around the sealing position. The four-layer film parts 16 and the double-layer film part 18 require different sealing conditions (for example, the sealing temperature of the electrical heating wires and the pressure of the block members). The sealing conditions suitable for sealing the four-layer film parts may cause the double-layer film part to be excessively fused. At this time, under the effect of bilateral tension force of the plastic bag 10, a split 19 can be formed in the double-layer film part 18 of the plastic bag 10 around the sealing line 14, as shown in FIG. 1D.

SUMMARY OF THE PRESENT INVENTION

It is, therefore, an objective of the present invention to provide a sealing machine and the protecting structure, that fit a wide range of sealing conditions and plastic bag materials and prevent the plastic bag from breaking around the sealing line.

It is another objective of the present invention to provide a sealing machine, which uses two protecting belts to provide single-layer protective zones and double-layer protective zones for making an intermittent sealing line, fitting a wide range of sealing conditions and plastic bag materials and preventing the plastic bag from breaking around the sealing line.

It is still another objective of the present invention to provide a protecting structure for sealing machine, which provides single-layer protective zones and double-layer protective zones for making an intermittent sealing line during a sealing operation.

The present invention provides a sealing machine, comprising: a pair of block members opposite to each other; a pair of first protecting belts respectively covered on said electrical heating wire; a pair of second protecting belts respectively covered on said first protecting belts; wherein one of said pair of first protecting belts and said pair of second protecting belts comprises a plurality of apertures.

In one embodiment of the present invention, said apertures are disposed in each said first protecting belt.

In one embodiment of the present invention, said apertures are equally spaced along each said electrical heating wire.

In one embodiment of the present invention, said apertures are disposed in each said second protecting belt.

In one embodiment of the present invention, said first protecting belts and said second protecting belts are respectively made of a heat resistant material.

The present invention further provides a protecting structure for sealing machine, comprising: a first protecting belt covered on an electrical heating wire of the sealing machine; and a second protecting belt covered on said first protecting belt; wherein said first protecting belt and said second protecting belt define a plurality of single-layer protective zones and a plurality of double-layer protective zones alternatively disposed.

In one embodiment of the present invention, said first protecting belt comprises a plurality of apertures.

In one embodiment of the present invention, said apertures are equally spaced along said electrical heating wire.

In one embodiment of the present invention, said second protecting belt comprises a plurality of apertures.

In one embodiment of the present invention, said apertures are equally spaced along said electrical heating wire.

DETAILED DESCRIPTION OF THE PREFERRED EMBODIMENTS

Figure 1B:
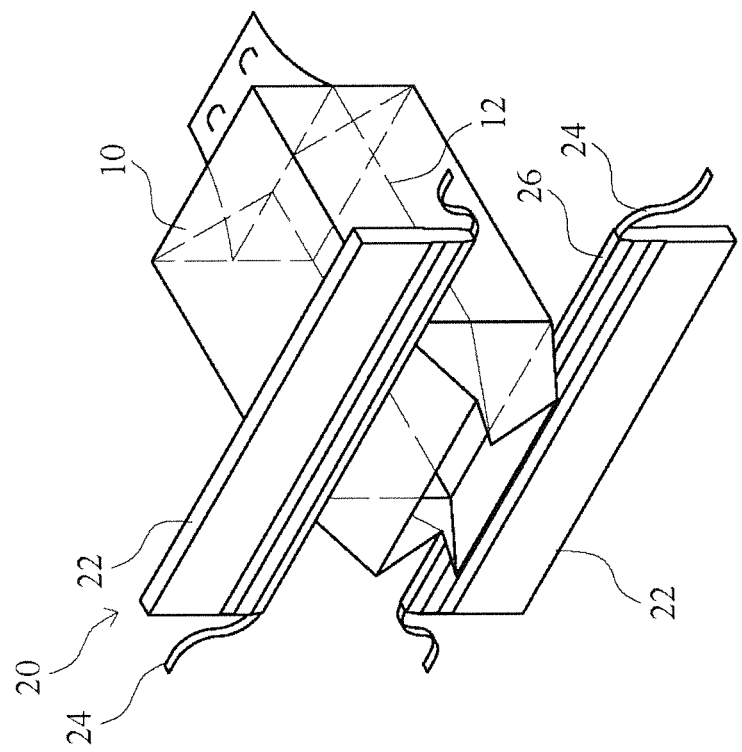
FIGS. 1A-1C are schematic drawings illustrating the operational steps of a sealing machine according to the prior art.
Figure 1A:
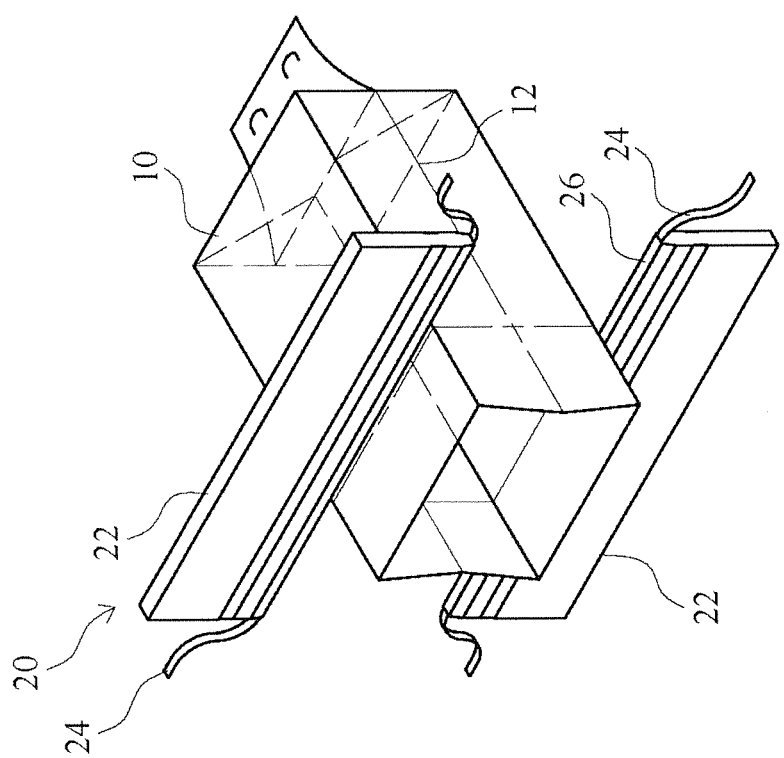
Figure 1C:
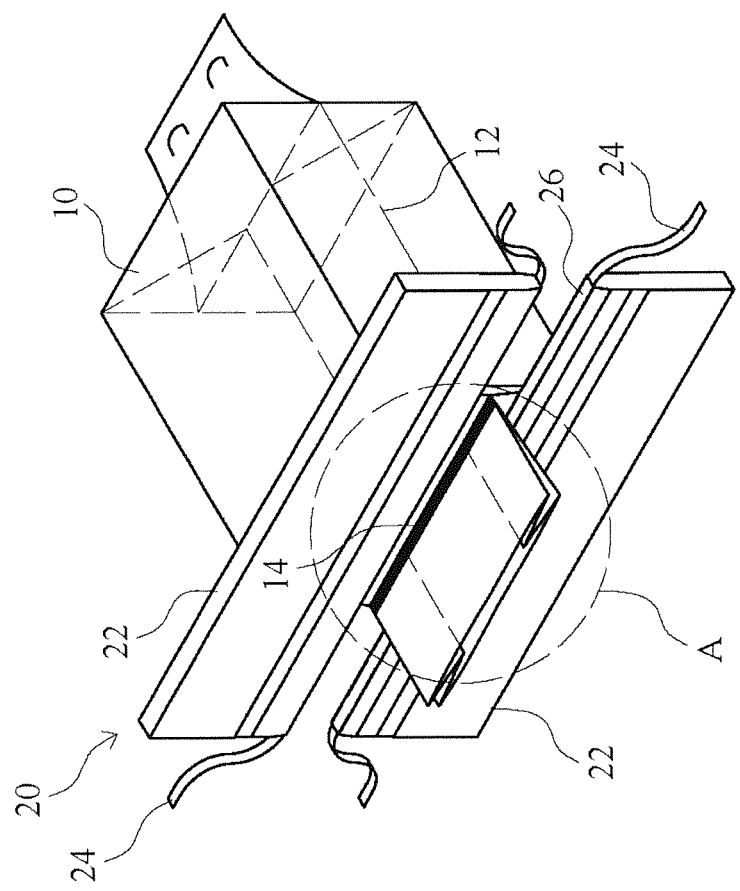
Figure 1D:
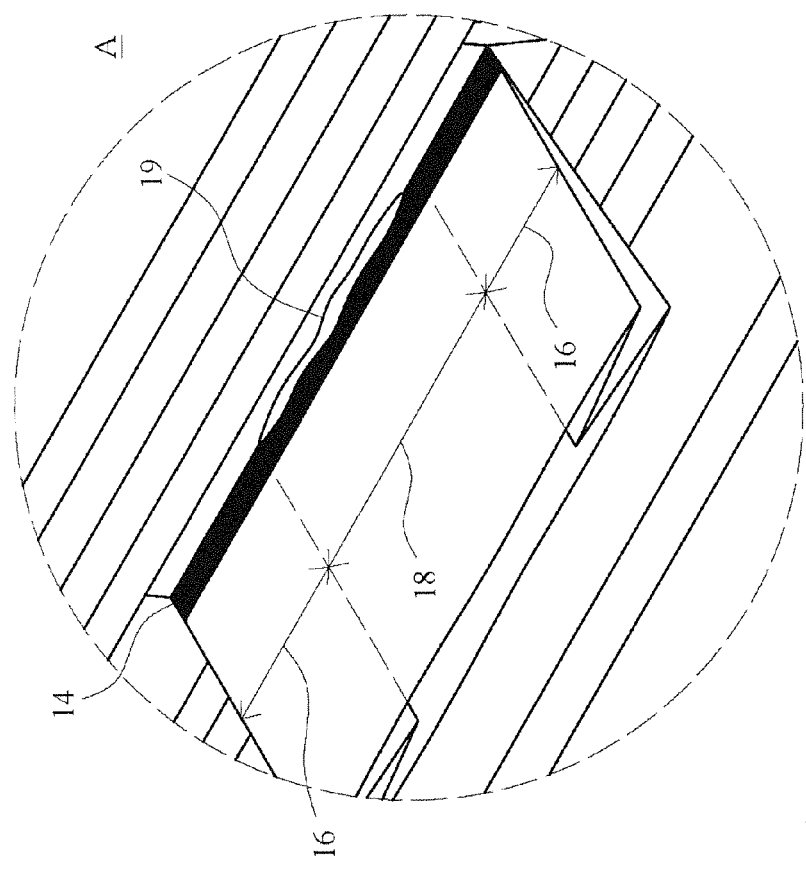
FIG. 1D is an enlarged view of Part A of FIG. 1C.
Figure 2A:
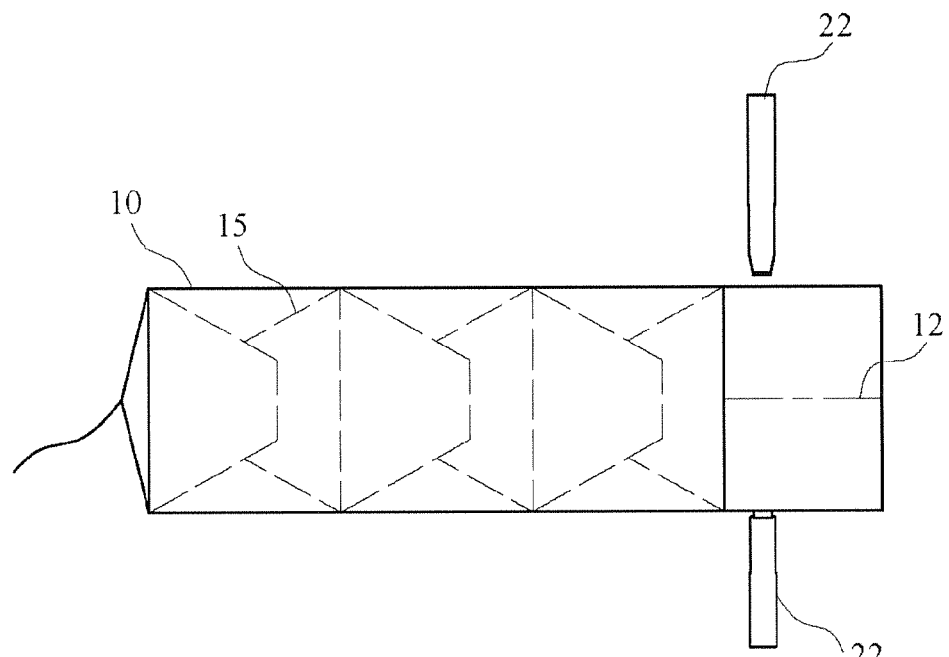
FIGS. 2A-2C are schematic side views illustrating the operational steps of the sealing machine according to the prior art.
Figure 2B:
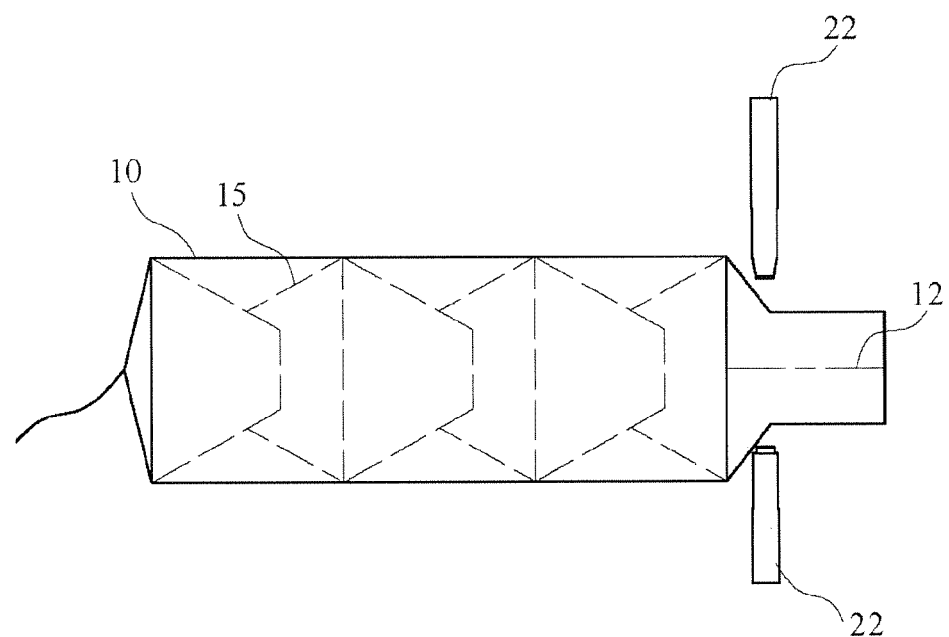
Figure 2C:
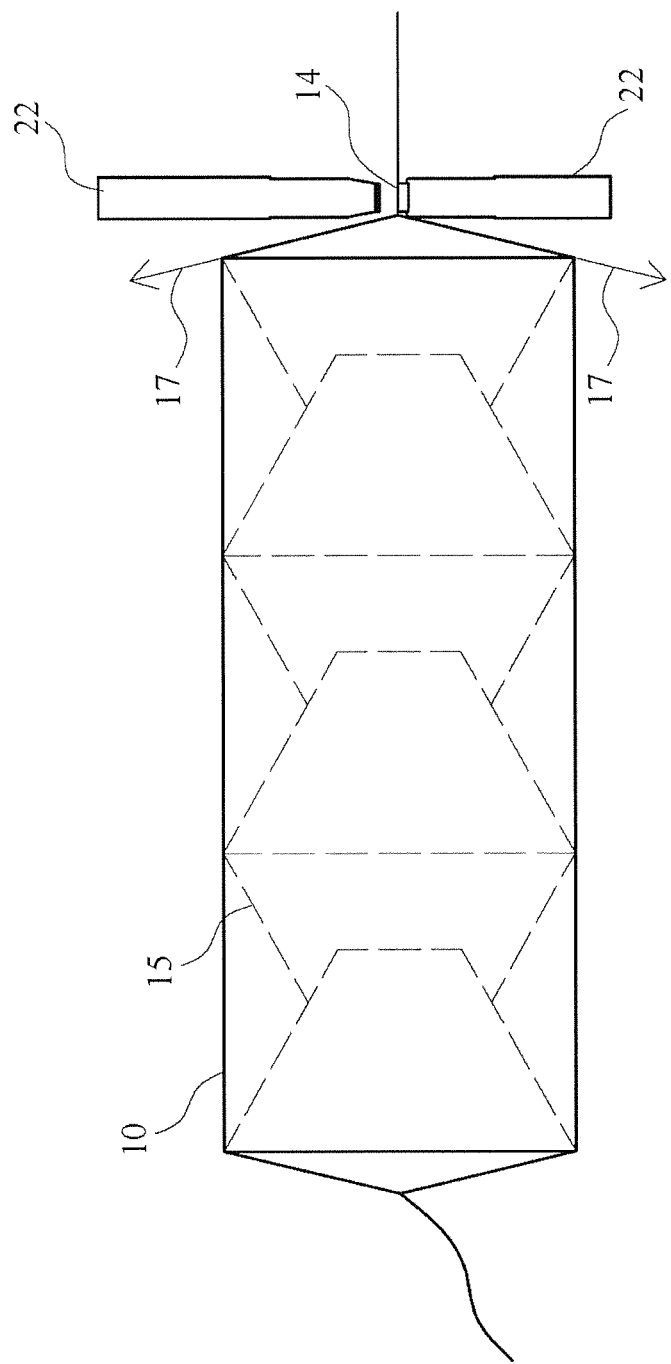

Referring to FIGS. 3-7, a schematic perspective view, a partial exploded view, a partial front view and enlarge view of parts of a sealing machine in accordance with one embodiment of the present invention are shown. As illustrated, the sealing machine 30 comprises a pair of block members 32, a pair of electrical heating wires 34, a pair of first protecting belts 36, and a pair of second protecting belts 38.

Figure 3:
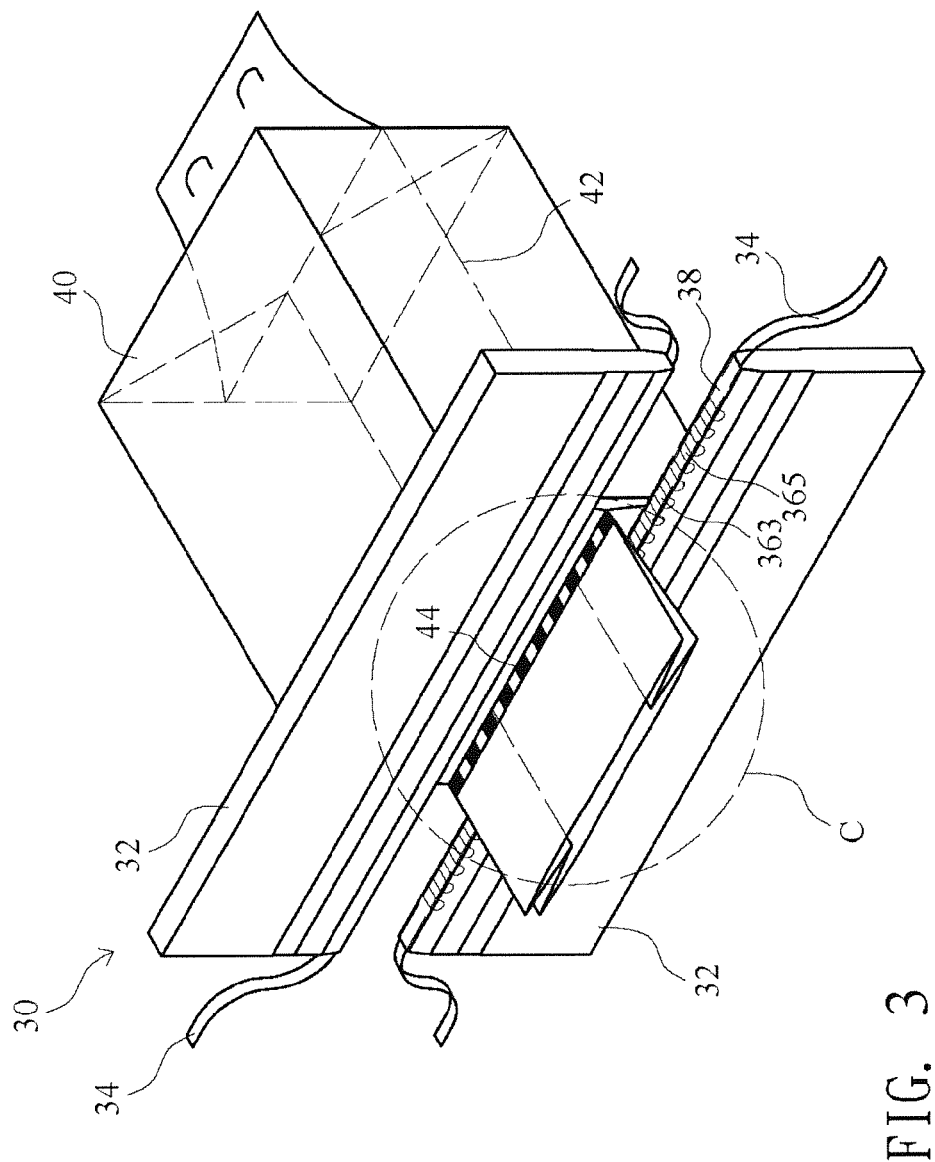
FIG. 3 is a schematic perspective view of a sealing machine in accordance with one embodiment of the present invention.
Figure 4:
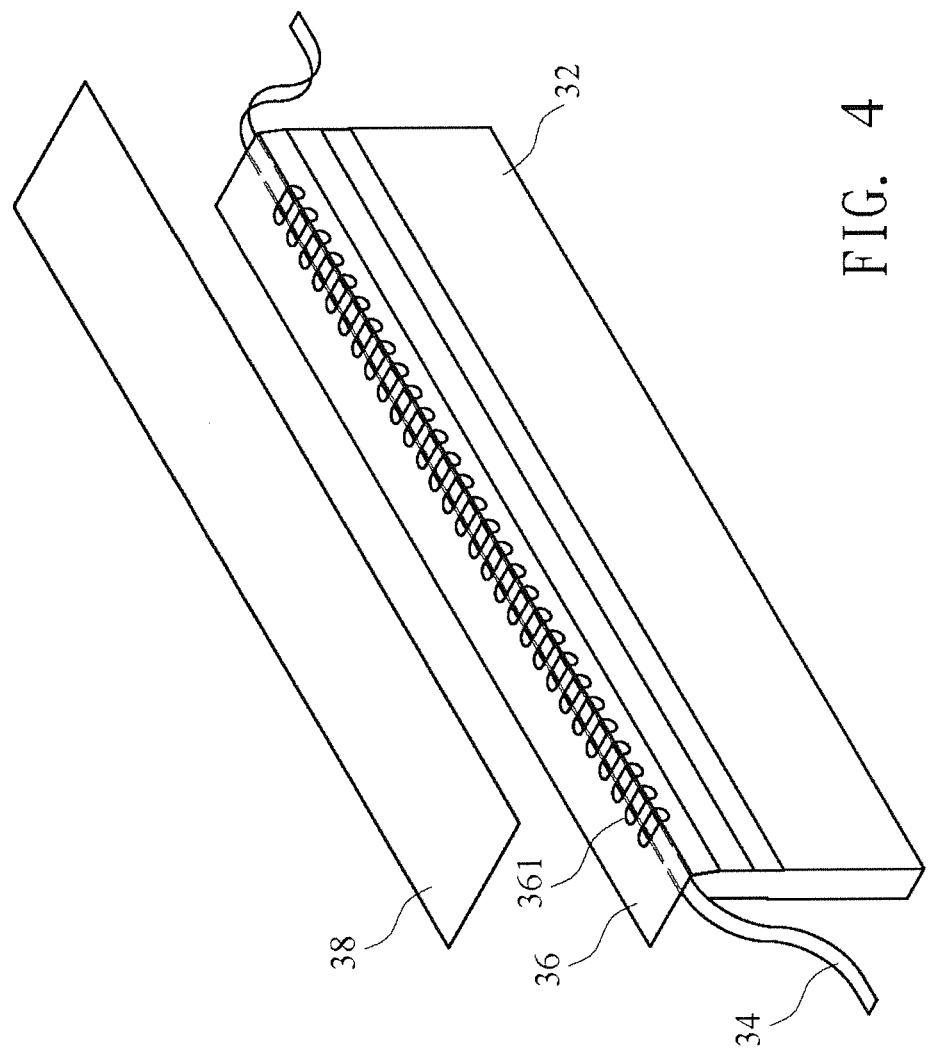
FIG. 4 is an exploded view of a part of the sealing machine in accordance with the embodiment shown in FIG. 3.
Figure 5:
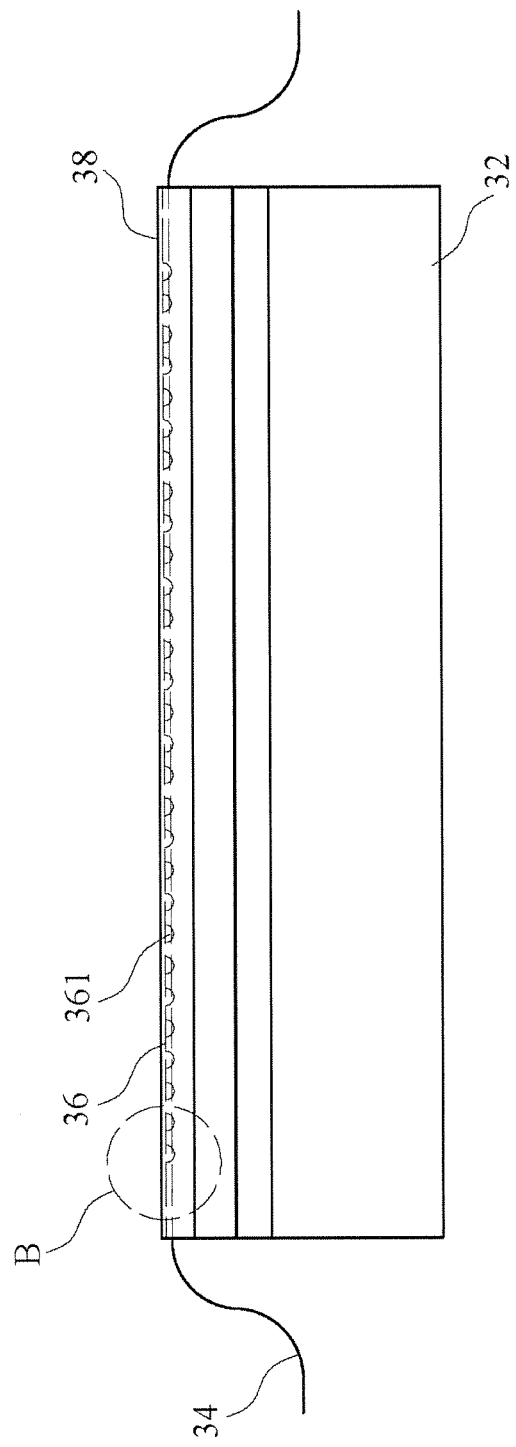
FIG. 5 is a front view of the sealing machine in accordance with the embodiment shown in FIG. 3.

The two block members 32 are disposed opposite to each other. The two electrical heating wires 34 are respectively mounted at the block members 32 corresponding to each other. The two first protecting belts 36 are respectively covered on the electrical heating wires 34. The two second protecting belts 38 are respectively covered on the first protecting belts 36. Further, a plurality of apertures 361 can be provided in the first protecting belts 36 or second protecting belts 38. In the present embodiment, as illustrated in FIGS. 3-5, apertures 361 are provided in the first protecting belts 36. However, it is to be noted that prividing apertures 361 in the second protecting belts 38 can achieve the same effects.

Figure 6:
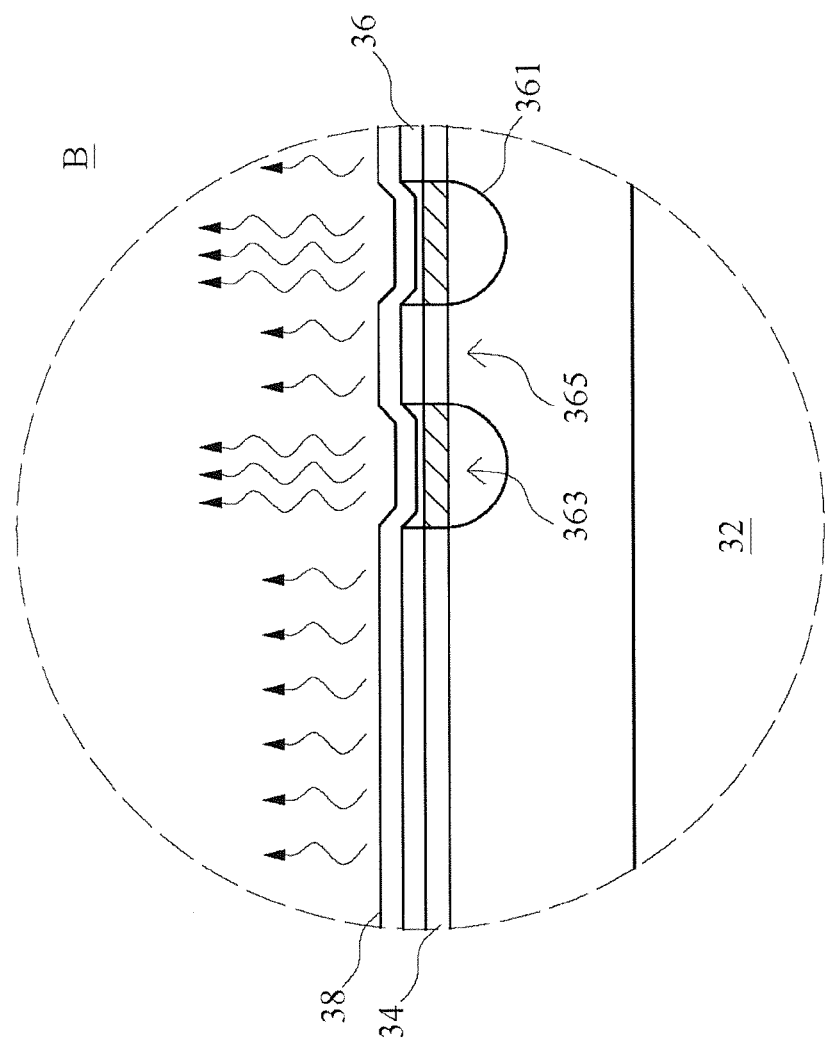
FIG. 6 is an enlarged view of Part B of FIG. 5.

In one embodiment of the present invention, after covered the first protecting belts 36 and the second protecting belts 38 on the electrical heating wires 34 respectively, due to the presence of the apertures 361 in the first protecting belts 36, single-layer protective zones 363 and double-layer protective zones 365 are formed on each electrical heating wire 34, as shown in FIG. 6.

Figure 7:
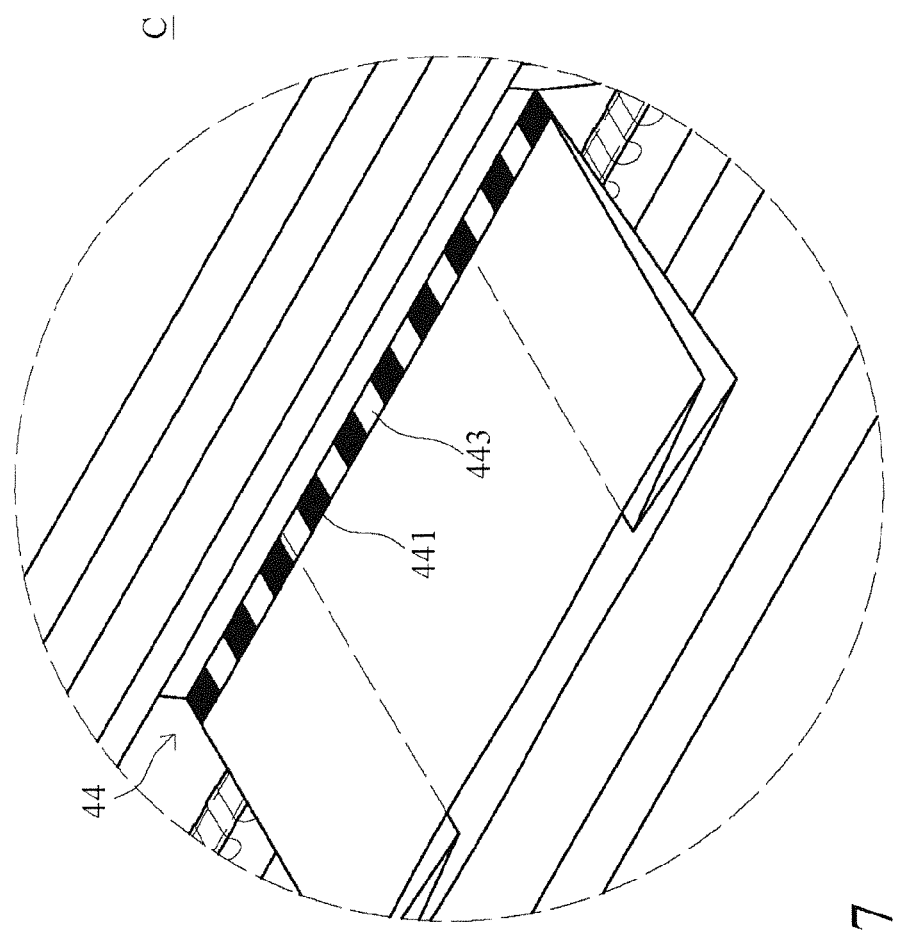
FIG. 7 is an enlarged view of Part C of FIG. 3.

During the operation of the electrical heating wires 34 to heat a plastic bag 40, a sealing line 44 comprising a plurality of heavy-fusion portions 441 corresponding to the respective single-layer protective zones 363 and a plurality of light-fusion portions 443 corresponding to the respective double-layer protective zones 365 will be formed on the plastic bag 40 subject to different heat barrier properties of the single-layer protective zones 363 and the double-layer protective zones 365, as shown in FIG. 7.

When using the sealing machine and the protecting structure of the present invention, the heating temperature of the electrical heating wires 34 and the clamping force between the block members 32 can be adjusted to a conduction that the heavy-fusion portions 441 are satisfy for four-layer film sealing conditions and the light-fusion portions 443 are satisfy for double-layer film sealing conditions. Thus, in addition to the formation of the effective sealing line 44, the plastic film will not be broken at the sealing line 44 by the bilateral tension force, and the split as shown in the prior art design will be prevented.

In one embodiment of the present invention, the apertures 361 are equally spaced along the length of the first protecting belts 36 corresponding to the respective electrical heating wires.

In one embodiment of the present invention, apertures 361 are formed in the second protecting belts 38, such that the second protecting belts 38 and the first protecting belts 36 define a plurality of single-layer protective zones 363 and double-layer protective zones 365 on each electrical heating wire 34.

In one embodiment of the present invention, the apertures 361 are equally spaced along the second protecting belts 38 corresponding to the respective electrical heating wires.

In one embodiment of the present invention, the first protecting belts 36 and the second protecting belts 38 are made of a heat resistant material.

In conclusion, the invention provides a sealing machine and a protecting structure that fit a wide range of sealing conditions and plastic bag materials, and prevent the plastic bag from breaking around the sealing line due to excessive fusion and tension.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A sealing machine, comprising:
    a pair of block members disposed opposite to each other;
    a pair of electrical heating wires respectively mounted on opposing surfaces of said block members;
    a pair of multi-layered protecting belt portions each covering one of said electrical heating wires, each said multi-layered protecting belt portion including a first protecting belt overlaying one of said electrical heating wires and a second protecting belt covering said first protecting belt;
    wherein one of said first and second protecting belts of each said multi-layered protecting belt portion is formed with a plurality of apertures therethrough, each said multi-layered protecting belt portion thereby defining a plurality of different heat protective zones.

2. The sealing machine as claimed in claim 1, wherein said apertures are disposed in each first protecting belt of said pair of multi-layered protecting belt portions.

3. The sealing machine as claimed in claim 1, wherein said apertures are equally spaced along each electrical heating wire of said pair of electrical heating wires.

4. The sealing machine as claimed in claim 1, wherein said apertures are disposed in each second protecting belt of said pair of multi-layered protecting belt portions.

5. The sealing machine as claimed in claim 1, wherein said first protecting belts and said second protecting belts of said pair of multi-layered protecting belt portions are made of a heat resistant material.

6. A protecting structure for a sealing machine, comprising:
    a multi-layered protecting belt portion including a first protecting belt overlaying an electrical heating wire of the sealing machine and a second protecting belt covering said first protecting belt;
    wherein one of said first protecting belt and said second protecting belt of said multi-layered protecting belt portion is formed with a plurality of apertures therethrough, said multi-layered protecting belt portion thereby defining a plurality of alternatively disposed single-layer and double-layer protective zones.

7. The protecting structure as claimed in claim 6, wherein said first protecting belt includes the plurality of apertures.

8. The protecting structure as claimed in claim 7, wherein said apertures are equally spaced along said electrical heating wire.

9. The protecting structure as claimed in claim 6, wherein said second protecting belt includes the plurality of apertures.

10. The protecting structure as claimed in claim 9, wherein said apertures are equally spaced along said electrical heating wire.

* * * * *